United States Patent [19]

Armstrong

[11] 4,394,729
[45] Jul. 19, 1983

[54] JUMP RETURN STACK

[75] Inventor: Rolfe D. Armstrong, Escondido, Calif.

[73] Assignee: NCR Corporation, Dayton, Ohio

[21] Appl. No.: 197,417

[22] Filed: Oct. 16, 1980

[51] Int. Cl.[3] .............................................. G06F 9/42
[52] U.S. Cl. .................................................. 364/200
[58] Field of Search ... 364/200 MS File, 900 MS File

[56] References Cited

U.S. PATENT DOCUMENTS

| 3,396,371 | 8/1968 | Waldecker | 364/200 |
| 4,176,394 | 11/1979 | Kaminski et al. | 364/200 |
| 4,228,497 | 10/1980 | Gupta et al. | 364/200 |

FOREIGN PATENT DOCUMENTS 2408174  1/1979  France .

OTHER PUBLICATIONS

J. A. Kiselak et al., "Microprogram Link/Return Mechanism", *IBM Technical Disclosure Bulletin*, vol. 22, No. 8B, Jan. 1980, pp. 3775-3777.

Primary Examiner—Raulfe B. Zache
Attorney, Agent, or Firm—J. T. Cavender; Edward Dugas; Donald P. Gillette

[57] ABSTRACT

A jump return stack is provided in a data processor having a plurality of control registers including a fetch control register and an execution control register. The jump return stack comprises a memory stack, an address register, and a counter-register interposed between the memory stack and the control registers of the data processor. The counter-register is always made to store the latest entry into the memory stack, that is the top of the stack, such that the latest entry into the stack is immediately available to the control registers of the data processor thereby eliminating a memory access to the stack.

9 Claims, 7 Drawing Figures

FIG. 3

MAIN PROG

| LOC | |
|---|---|
| 100 | INST1 |
| 101 | INST2 |
| 102 | INST3 |
| 103 | JUMP SUBRTN1 |
| 104 | INST4 |

SUBRTN1

| LOC | |
|---|---|
| 150 | INSTA |
| 151 | INSTB |
| 152 | INSTC |
| 153 | JUMP SUBRTN2 |
| 154 | INSTD |
| 160 | RETURN |

SUBRTN2

| LOC | |
|---|---|
| 271 | INSTAA |
| 272 | INSTBB |
| 277 | RETURN |

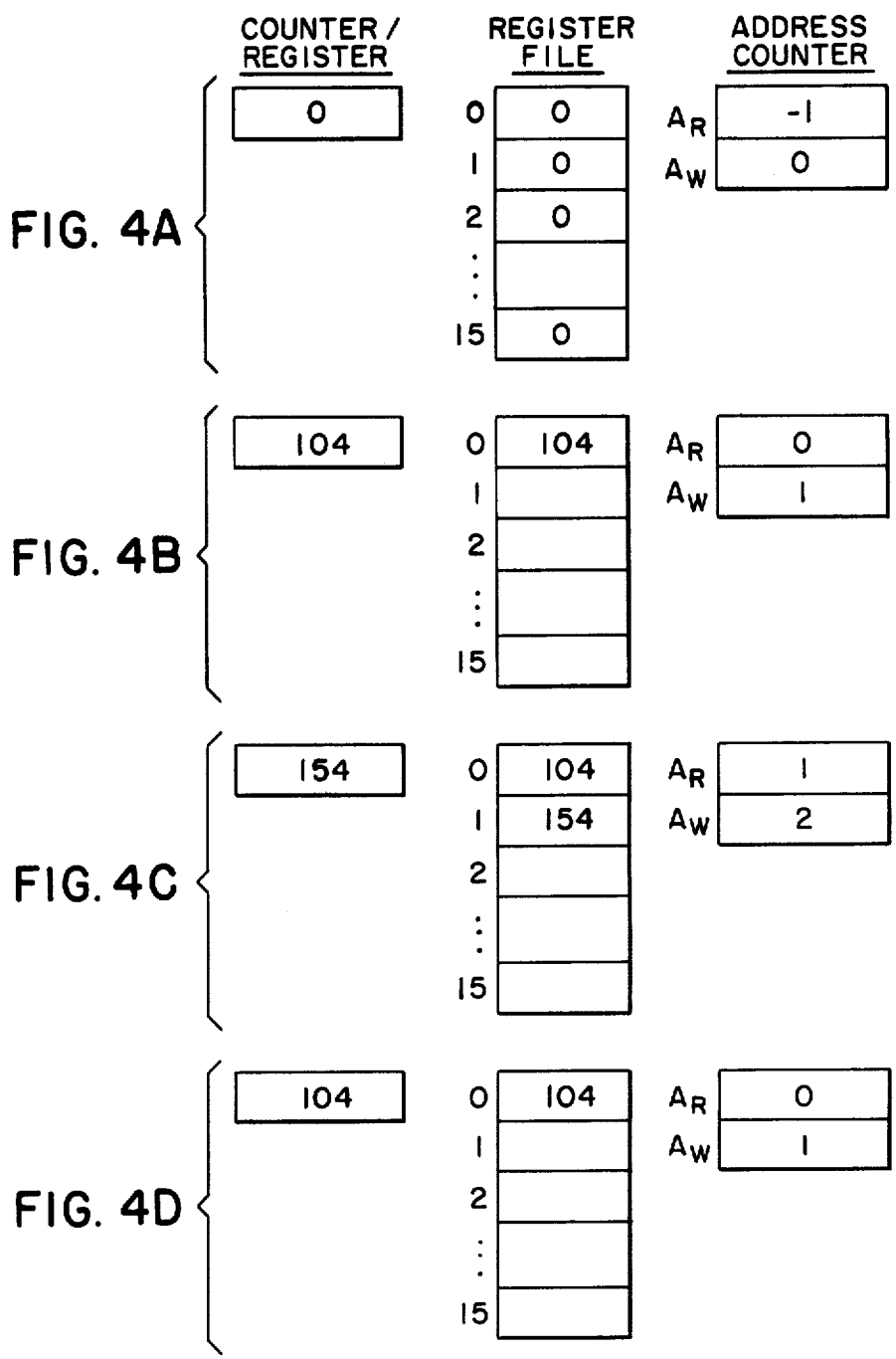

JUMP RETURN STACK

BACKGROUND OF THE INVENTION

This invention relates to digital logic circuits of a digital computer, and more particularly, to a digital computer memory stack for storing return addresses whenever a subroutine or loop is executed.

In existing digital computer systems, stacks have been utilized for storing information in an automated, orderly manner to aid in reducing the time required to perform some of the various operations of a digital computer. Of particular interest is an implementation of a memory stack disclosed in U.S. Pat. No. 3,396,371, entitled "Controller for Data Processing System", by D. E. Waldecker. The referenced patent discloses a pushdown memory in which the first memory position or first register, is designated the instruction counter. Information supplied to the pushdown memory is supplied through the first position, the information previously held in the first position being automatically transferred downward in the push-down memory. A branch or a jump instruction causes the address portion of the instruction plus one to be stored in the first position of the push-down memory, the return point of the main program (i.e., the current value in the instruction counter plus one) being pushed-down. A return instruction executed by the subroutine causes the return address of the main program to be pushed-up to the first position of the push-down memory, thereby effecting an orderly return to the main program. Each access of the push-down memory requires some finite amount of time slowing up the execution of the computer. The present invention is designed to enhance the operation of the processor by eliminating the memory stack access time with a minimum of additional hardware.

SUMMARY OF THE INVENTION

The invention of the current application relates to a data processor which has a plurality of stages and further has a plurality of control registers including a fetch control register and an execution control register. Each of the plurality of control registers is associated with a corresponding one of the plurality of stages. The plurality of control registers are connected in a fashion for receiving a control store address such that the control store address follows an associated microinstruction through each of the plurality of stages of the data processor. A jump return stack is included in combination with selected ones of the plurality of control registers. The jump return stack comprises a storage device for storing a plurality of information units and an address register having a plurality of input control signals to address generation operatively connected to the storage device, for addressing the storage device. A counter/register operatively connected to the storage device, operatively connected to the execution control register, and operatively connected to the fetch control register, is included for storing the latest information unit inputted to the storage device, thereby making the latest information unit immediately available to the fetch control register.

From the foregoing it can be seen that it is a primary object of the present invention to provide a jump return stack which eliminates the memory stack access time in the data processor operation.

It is another object of the present invention to make maximum use of existing processor hardware while adding a minimum amount of hardware.

It is another object of the present invention to provide for the loading of the plurality of execute registers with data tables stored in control store.

These and other objects of the present invention will become more apparent when taken in conjunction with the following description and attached drawings, which drawings form a part of the present application.

BRIEF DESCRIPTION OF THE DRAWINGS

FIG. 3 is a sample microinstruction main program and associated subroutines; and FIG. 4A-D shows the contents of the jump return stack at various points in the execution of the sample microinstructions of FIG. 3.

DESCRIPTION OF THE PREFERRED EMBODIMENT

Figure 1:
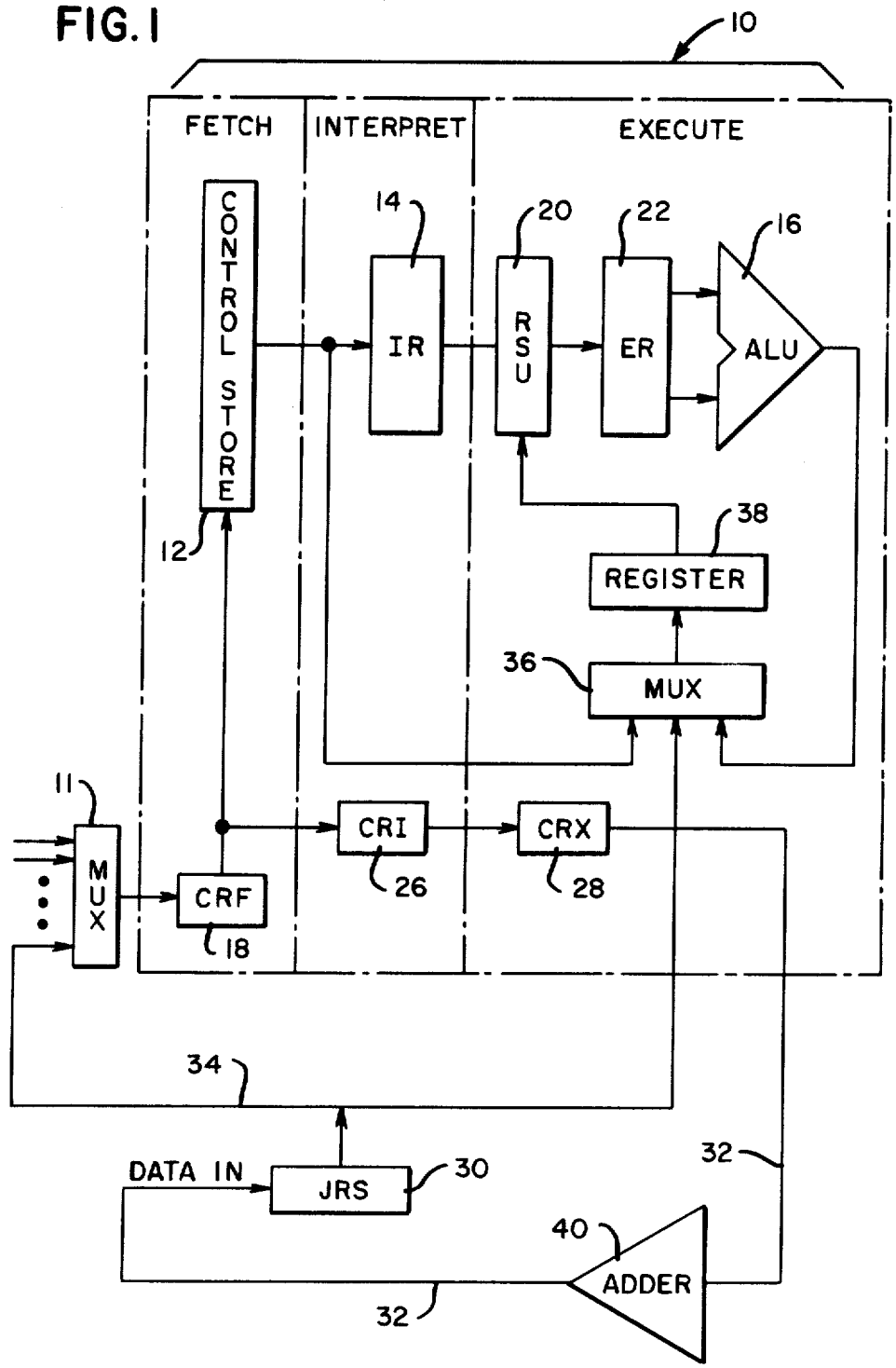
FIG. 1 shows a block diagram of a conventional data processor which incorporates the jump return stack of the current invention.

FIG. 1 shows, in simplified block form, a processor 10 of a conventional data processing system which has incorporated therein, the jump return stack of the current invention. The processor 10 has a so-called pipeline architecture and includes a FETCH stage, an INTERPRET stage and an EXECUTE stage. The FETCH stage includes a control store 12 that stores a plurality of microinstructions used by the processor during the execution of a computer program. The INTERPRET stage includes an instruction register (IR) 14 and suitable decoding circuitry (not shown since decoders are well known by those skilled in the art and not necessary for an understanding of the invention) for interpreting and decoding each microinstruction provided by the FETCH stage. The EXECUTE stage includes an arithmetic and logic unit (ALU) 16, a register storage unit (RSU) 20, an execution register (ER) 22, and other circuitry for performing any arithmetic or logic operations necessary to execute each microinstruction interpreted by the INTERPRET stage. The register storage unit 20 contains a plurality of registers which interfaces with the various execute units of the processor 10, such as ALU 16. A control register (CRF) 18 is associated with the FETCH stage. The control register 18 holds a control store address and provides that control store address to the control store 12 in order to access each microinstruction to be executed by the processor 10 or to access data to be transferred to RSU 20. The processor 10 as described thus far is conventional.

In order to diagnose operational errors in the processor 10, additional diagnostic circuitry is provided for enhancing diagnosability, such as that described in U.S. patent application Ser. No. 107,735, filed Dec. 27, 1979, for Diagnostic Circuitry in a Data Processor by R. D. Armstrong and D. A. Walsh, assigned to NCR Corporation, the assignee of the present application. The additional diagnostic circuitry, discussed only to the extent necessary for an understanding of the present invention, includes an INTERPRET control register (CRI) 26, and the EXECUTE control register (CRX) 28. The control registers CRI 26 and CRX 28 are connected for receiving, in a sequential fashion, each control store address from the control register CRF 18 such that each control store address follows its associated microinstruction through each of the stages in the processor 10. Accordingly, the control register CRI 26 stores the control store address of the microinstruction passing through the INTERPRET stage of the processor 10, and the control register CRX 28 stores the same control store address when that microinstruction reaches the EXECUTE stage.

The present invention finds use in a microprogrammed general purpose computer for providing a return address whenever a subroutine or loop is executed. Still referring to FIG. 1, the inclusion of a jump return stack (JRS) 30 in the processor 10 is shown. The input of the JRS 30 is operatively connected to the control register CRX 28 via connection 32, an adder 40 forming part of the connection 32, and the output of the JRS 30 being coupled to MUXs 11, 36 via connection 34.

When a jump is to be executed, the JRS 30 receives the address of the jump instruction from CRX 28 via connection 32 incremented by one by adder 40 yielding a return address. The return address is stored in JRS 30 until a return instruction is executed, whereupon the return address is transmitted to the CRF 18 via connection 34 and multiplexer 11. It is recognized by those skilled in the art, that there may exist in processor 10, the multiplexer (MUX) 11 and the plurality of inputs to MUX 11 from various parts of the processor 10 for loading CRF 18, such as from a bootstrap or loader section, and are not discussed further herein. A multiplexer (MUX) 36 permits the JRS 30 to transfer data into RSU 20 via register 38. The JRS 30 can store base addresses of tables stored in CS 12. These addresses can be loaded into CRF 18 without popping the JRS 30, thereby allowing the data transfer into RSU 20. This operation will be described further hereinunder.

Figure 2:
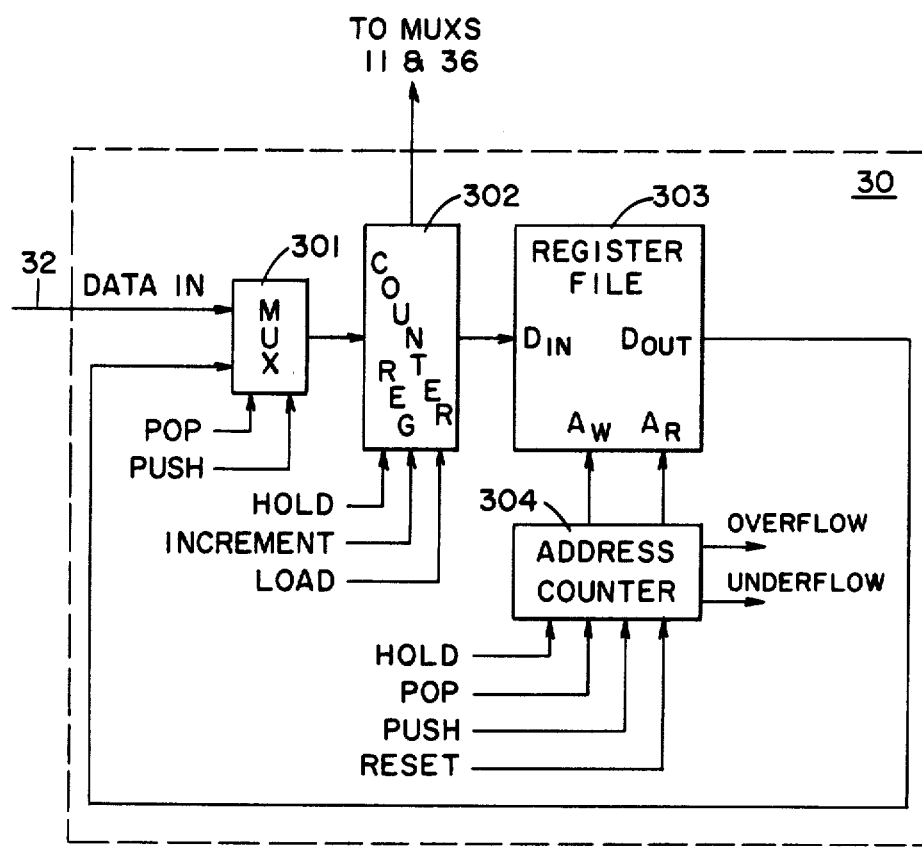
FIG. 2 is a block diagram of the jump return stack.

FIG. 2 shows a block diagram of JRS 30. A 2/1 MUX 301 receives data from the CRX 28 via the input line denoted DATA IN, or from the output of a register file 303 ($D_{OUT}$). The output of MUX 301 is transmitted to a counter/register 302 which can hold, increment, or load the inputted data in response to the applicable control signals. The output of counter/register 302 is operatively connected to MUXs 11, 36 for inputting data into the fetch control register 18, or the RSU 20, respectively. The output of the counter/register 302 is also operatively connected to register file 303 ($D_{IN}$). The register file 303, which forms the memory stack, is a storage device for storing a plurality of information units, a unit comprising a computer word, a number of bytes or bits constituting a single data quantity, etc. In the preferred embodiment, the register file 303 is a 16×16-bit RAM for storing sixteen bit addresses of control store 12. The register file 303 is accessed by address counter 304.

The operation of the JRS 30 will now be described with the aid of FIGS. 3 and 4. The computer execution of a macro-program instruction invokes the operation of a series of microinstructions referred to as a main program. For purposes of illustration, the microinstructions being invoked reside at a starting location (LOC) of 100 in control store 12. INST1, INST2, INST3, are representative microinstructions and are executed in a normal fashion by processor 10. (Note the microinstructions of FIG. 3 are denoted INSTX for simplicity without including the details of operation code, operands, etc.). At location 103 a jump to subroutine 1 (SUBRTN1) is executed bringing the action of the JRS 30 into play. The execution of a jump instruction causes a transfer out of CRX 28, and initiates a PUSH control signal which starts a push operation. The address (LOC 103) of the jump instruction is incremented by one to a value of 104, and the push operation causes MUX 301 to select the DATA IN input, which is the incremented address 104 from the adder 40, and to load this address into counter/register 302. Address counter 304 supplies two addresses to register file 303, a write address $A_W$ and a read address $A_R$. Initially $A_W$ is set to zero and $A_R$ is set to minus one. $A_R$ is always equal to $A_W$ minus one. The push operation proceeds by writing the contents of the counter/register 302 into the location of the register file 303 specified by the write address counter $A_W$. In the example, the quantity 104 is written into location 0. The return address of the jump, the quantity 104, is also retained in counter/register 302. Finally, the address counter is incremented such that $A_W$ equals 1 and $A_R$ equals 0. FIG. 4A shows the initial contents of the counter/register 302, the register file 303, and the address counter 304. FIG. 4B shows the contents of the JRS 30 after the first push operation is completed.

Likewise, if a jump instruction is executed within SUBRTN1 before returning to the main program, as, for example, from the address 153 in SUBRTN 1 to the address 271 in SUBRTN 2, the address of the jump instruction within the subroutine is written into the location of the register file 303 specified by $A_W$ of address counter 304 and the address incremented by one is retained in counter/register 302. In this manner, the latest entry, the address 154, into register file 303 is also contained in counter/register 302. When the jump instruction at the address 153 of SUBRTN1 is completed, the contents of JRS 30 will be as shown in FIG. 4C.

When a subroutine executes a return instruction, a POP control signal is generated which initiates the pop operation. Since the counter/register 302 contains the entry address into SUBRTN1, the return to SUBRTN1 from SUBRTN2 can begin immediately without having to make a memory access to the register file 303. The return address is outputted immediately to CRF 18 or RSU 20 allowing entry back to the correct point in SUBRTN1. While the return is being executed, register file 303 is read utilizing $A_R$ of address counter 304, which loads counter/register 302 with the contents of the now latest entry in the register file 303. As shown in FIG. 4C, this is the address 154. Finally, the pop operation causes the address counter 304 to decrement by one. The contents of the JRS 30 after the pop operation is as shown in FIG. 4D. In a similar fashion, the return instruction at address 160 of SUBRTN1 causes the return to address 104 of the main program at the proper entry point. The push and pop operation as described above always causes the counter/register 302 to contain the latest entry into the register file 303. The latest entry into the register file 303 is sometimes referred to as the top of stack (TOS). Reading the counter/register 302 effectively reads the TOS (i.e., the next address to be used for a return instruction), thereby speeding up the pop operation since no memory access is required for the return. The memory access for loading the counter/register 302 overlaps other computer operations.

In order to load RSU 20 with data stored in a table arrangement in CS 12, the base address of the table is initially loaded into counter/register 302. This address is then loaded into control register CRF 18 via MUX 11 and the first CS 12 read initiated. The counter/register 302, which initially contains the base address of the table, is incremented during the CS 12 read by the IN- CREMENT control signal without a pop operation of the JRS 30. The contents of the counter/register 302, which now contains the next address of data within the table, is again loaded into control register CRF 18 such that the next data quantity of the table may be read from CS 12. The RSU 20 load operation repeats under processor 10 control until the entire data table is read from CS 12.

The address counter 304 generates an OVERFLOW signal when a push operation is attempted and the register file 303 is full. Likewise, the address counter 304 generates an UNDERFLOW signal when a pop operation is attempted and the JRS 30 is empty.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

I claim:

1. In a data processor comprising control store means to store instructions at specific addresses, fetch control register means connected thereto to control the operation thereof, execution means to process information fetched from the addresses in controllable sequence, jump return stack means comprising:

storage means for storing a plurality of jump return addresses in order;

counter means connected to said storage means for addressing said storage means; and register means connected to said storage means to supply address information thereto and separately connected to said execution means and separately connected to said fetch control register means for storing the latest jump return address inputted to said jump return stack means, to make the latest jump return address available to said fetch control register means independently of receiving a jump return address directly from the storage means.

2. A jump return stack according to claim 1, wherein the storage means comprises a RAM operated on a last-in-first-out basis for storing a plurality of jump return addresses in order.

3. A jump return stack according to claim 2, wherein said register means comprises:

a plurality of register output terminals;

a multiplexer having a first input terminal and a second input terminal, said first input terminal being connected to one of said output terminals, and said second input terminal being connected to said execution control register means; and a counter/register connected to said multiplexer for receiving said jump return addresses and connected to said storage means for transmitting a jump return address to be stored in said storage means, and further connected to said fetch control register for restoring said stored jump return address.

4. A jump return stack according to claim 3, wherein said counter means comprises:

a first counter connected to said storage means and having input means to receive a plurality of input control signals for addressing said storage means when said storage means is commanded to perform a read operation by one of said plurality of input control signals; and a second counter connected to said storage means and having means to receive the plurality of input control signals for addressing said storage means when said storage means is commanded by one of said plurality of input control signals to perform a write operation.

5. A jump return stack according to claim 4, wherein said counter/register comprises means to receive a control signal to increment said jump return address stored therein.

6. A jump return stack according to claim 3, wherein said counter means comprises a first and second counter connected to said storage means and responsive to the plurality of input control signals for address generation to cause said first counter to contain a first quantity corresponding to an address of said storage means and said second counter to contain a second quantity having a value one greater than said first quantity and corresponding to the next address in which a jump return address is to be stored in said storage means.

7. A jump return stack according to claim 3, wherein said counter means comprises first and second counters connected to said storage means and responsive to a plurality of input control signals for address generation, and further connected to said data processor for indicating status conditions of said jump return stack, said status conditions including underflow and overflow conditions.

8. A jump return stack according to claim 3, and comprising an execute stage having a plurality of execute registers, said counter/register being connected to said plurality of execute registers.

9. A jump return stack according to any one of claims 4, 5, 6, 7, or 8, wherein said connection between said register means and said execution control register means includes an adder.

* * * * *